UNITED STATES PATENT OFFICE.

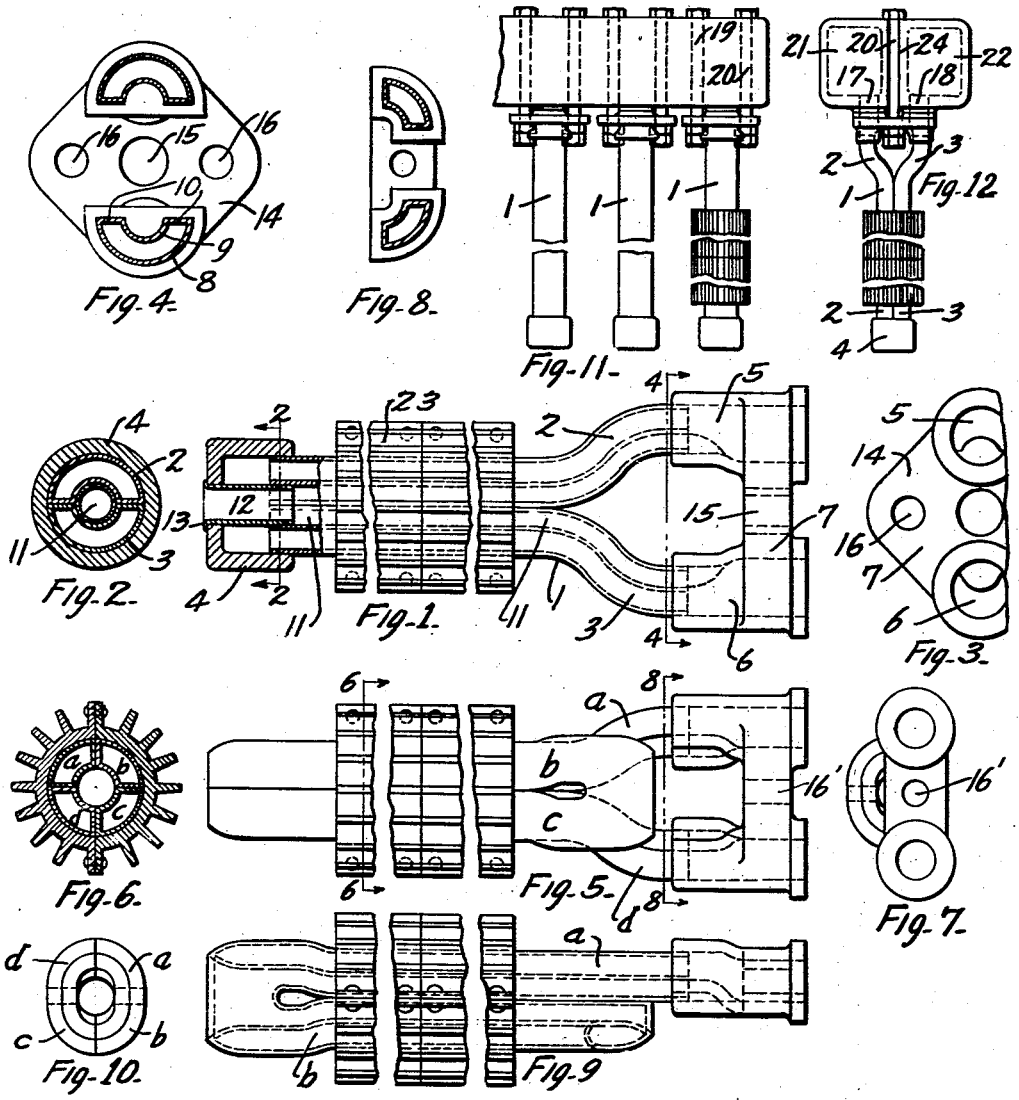

FRANCIS N. POIGNAND, OF RUTHERFORD, NEW JERSEY, ASSIGNOR TO LOCOMOTIVE SUPERHEATER COMPANY, OF NEW YORK, N. Y., A CORPORATION OF DELAWARE.

SUPERHEATER UNIT.

1,304,091.  Specification of Letters Patent.  Patented May 20, 1919.

Application filed January 26, 1918. Serial No. 214,014.

*To all whom it may concern:*

Be it known that I, FRANCIS N. POIGNAND, a subject of the King of England, residing at Rutherford, in the county of Bergen, State of New Jersey, have invented certain new and useful Improvements in Superheater Units, of which the following is a description such as required by the statute.

My invention relates to superheaters, and concerns itself particularly with the provision of an improved form of the constituent elements or units of which such superheaters are usually made up.

The invention will be readily understood from the following description and the accompanying drawing. In the latter, Figure 1 illustrates in lateral elevation partly in section the improved unit according to my invention; Fig. 2 is a section on line 2—2 of Fig. 1; Fig. 3 is an end view of Fig. 1 viewed from the right; Fig. 4 is section taken on line 4—4 of Fig. 1, looking in the direction indicated by the arrows; Fig. 5 is a lateral, and Fig. 9 a front elevation of a modified form of the unit; Figs. 6 and 8 are sectional views on lines 6—6 and 8—8 respectively of Fig. 5; Fig. 7 is an end view of Fig. 5 viewed from the right; Fig. 10 is a bottom view of Fig. 9; Figs. 11 and 12 are front and side elevations respectively, on a reduced scale, of a superheater with units according to my invention. Throughout the views, portions have been broken away and omitted where this could be done without obscuring the invention.

Referring first to Figs. 1 to 4, the unit 1 comprises two parts or branches 2 and 3, united at one end by a return bend 4, and opening at the other end into chambers 5 and 6 respectively of the connector 7. The two branches 2 and 3 are pipes of a peculiar cross-section which will be clear from an examination of Figs. 2 and 4. The outer wall of each is semi-cylindrical, as at 8, Fig. 4; the inner wall 9 being likewise semi-cylindrical but on a smaller radius, the two being placed coaxial with each other and connected by the straight portions 10—10. When these two pipes are placed with their flat faces in contact the two inner semi-cylindrical surfaces together form a cylindrical opening 11. The openings in connector 7 with which the branches 2 and 3 communicate are of a shape corresponding to that of the branches, and the latter are welded in or otherwise secured.

At the opposite end a short length of pipe 12 is welded into the circular opening formed by the two pipes 2 and 3. The opening in the return bend 4, into which the ends of the pipes 2 and 3 are welded, is circular in shape, as shown in Fig. 2. The pipe length 12 extends through a circular opening in the farther wall of the return bend, and is beaded over as at 13. The lower edges of the flat portions 10—10 of the two pipes are also welded together.

In this manner a steam-tight return bend is provided, to which one of the branches delivers, and from which the other carries steam.

The connector 7 has a flat plate-like portion 14, with a central aperture 15, and two lateral holes 16—16. Integral with this plate are the two chambers 5 and 6, spoken of above, to which the pipes 2 and 3 are connected. The upper openings into chambers 5 and 6 are circular, as shown in Fig. 3, and register with corresponding openings 17 and 18 in the header. The connector 7 is secured to the header by means of two bolts 19 and 20, passing through holes 16 of the connector and through the slot 24 between the two chambers 21 and 22 of the headers. Steam is delivered to one of the two chambers 21 and 22 by a pipe (not shown), and conveyed from the other by a second pipe (also not shown).

It will be noted that the pipe 12, the opening 11, and the aperture 15 are in line with each other. The purpose of the channel thus formed is to allow the current of heating gases, to which the superheater is exposed, to flow not only along the outside of the units, but also through the unit. After passing through aperture 15 the gases escape by way of the slot 24 between the two chambers 21 and 22 of the header. At the same time a unit of this form is more compact than one made up of two branches of circular outline and equal cross-sectional area.

Secured to the outside of the unit is the protector 23. Its cross-sectional structure is readily gathered from Fig. 6, where it is applied to a modified form of the unit. It is made up of two similar halves which are bolted or riveted or otherwise secured together. Longitudinal fins are integrally secured to its outside. The protector is made up in sections, their individual length and total number being selected to suit circumstances. They cover substantially the entire length of the unit, and protect it from the severe direct heat of the gases. They can of course be readily renewed, or may be omitted if thought advisable, and do not form a part of my invention except as combined with other elements. In Fig. 11 the protector is shown on only one of the units, being left off the others to show more clearly their structure.

The operation of a superheater unit according to my invention as just described will be evident. Steam flows through one branch, e. g. branch 2, to the return bend 4, is reversed in direction and returns to the header through branch 3. In its course it is superheated by the hot gases flowing along the outside and through the central channel of the unit. As is indicated in Fig. 11, and will be understood by those versed in this art, there are any desired number of such units connected to the headers, the latter being made of the required size to accommodate the number of units used.

In the modification of Figs. 5 to 10, there are four branches through which the steam is carried before returning to the connector. Each of them makes up a quarter of the cylindrical structure, as will be clear from Fig. 6. The four branches are lettered a, b, c, and d in the several views. Branches a and b are connected with each other at the left of Figs. 5 and 9 by return bends integral with them, and branches c and d are likewise connected by such a return bend. Branches b and c are connected at their right ends by a return bend. This gives a continuous conduit for the steam. Beginning, e. g., from the right end of branch a, the steam flows to the left end, returns to the right through b, flows again to the left through c, and finally returns to the right end through d. The shape of each branch, as is clearly shown in Fig. 6, is such that there is again a central circular channel for the hot gases. The openings in the connector in this case are made to conform to the shape of the ends of the branches a and d (see Fig. 8). By way of variation, this connector is shown with a single opening $16^1$ for a bolt to connect it to the header. The aperture 15 becomes unnecessary, there being enough space between the several connectors for the escape of hot gases.

Having thus shown and described my invention, what I regard as new and desire to secure to myself by Letters-Patent is:—

1. An element for a superheater or similar structure comprising a plurality of separate branches connected only at their ends to form a continuous conduit, the branches being arranged about and equidistant from a central axis and in contact with each other, and each branch having the portion of its wall facing the center cylindrically concaved, whereby a central passage is provided inclosed by but not communicating with the interior of the branches.

2. An element for a superheater or similar structure comprising four branches connected only at their ends and forming a single continuous conduit, the branches being arranged in a group about and equidistant from the central axis and in contact with each other, and each branch having the portion of its wall facing the center cylindrically concaved, whereby a central passage is provided inclosed by the four branches but not communicating with their interior.

3. An element for a superheater or similar structure comprising four branches connected only at their ends and forming a single continuous conduit the wall of each branch comprising two coaxially arranged cylindrically curved portions whose edges are connected by two flat strips lying at right angles to each other, the four branches being arranged coaxially with each of the flat strips of one in contact with a flat strip of an adjacent one, the ends of the central passage thus formed being open.

FRANCIS N. POIGNAND.